Feb. 15, 1927.
W. E. NEAL
1,618,020
TIRE CHAIN
Filed Dec. 10, 1925
3 Sheets-Sheet 1
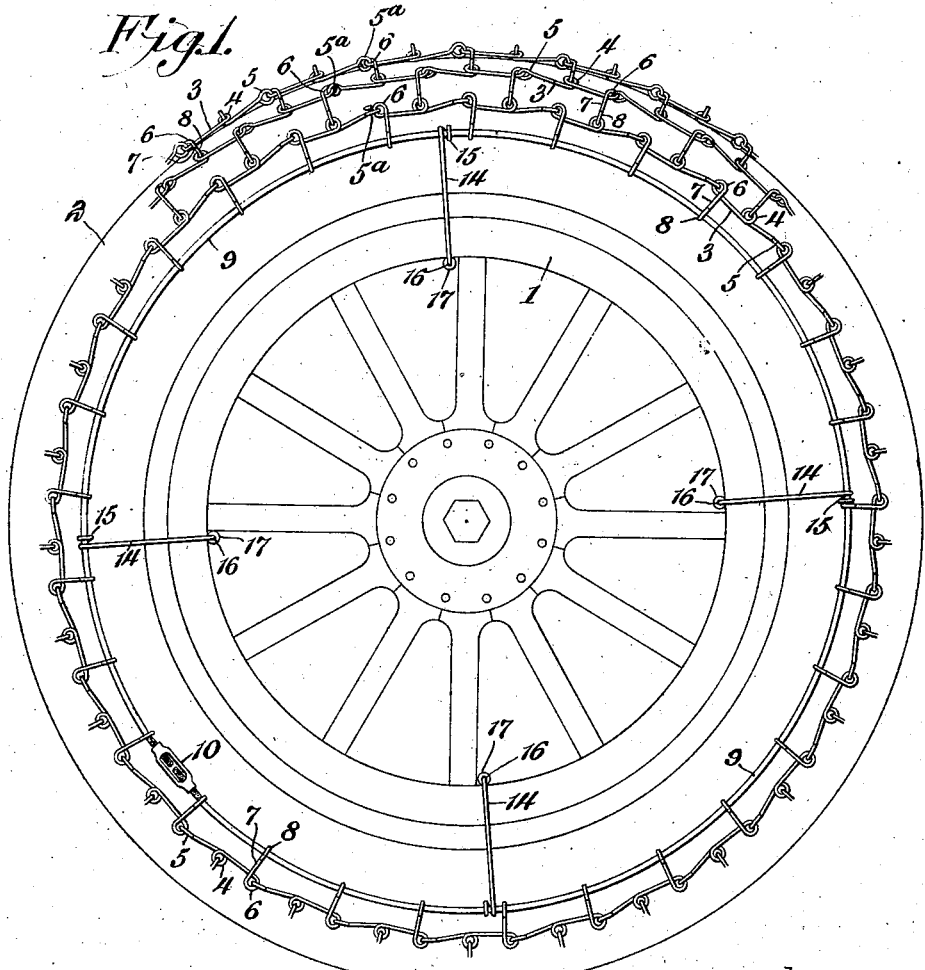
Witnesses
C. L. McDonald
Howard D. Orr
Inventor
William E. Neal
By
E. G. Siggers
Attorney Feb. 15, 1927. 1,618,020
W. E. NEAL
TIRE CHAIN
Filed Dec. 10, 1925  3 Sheets-Sheet 2
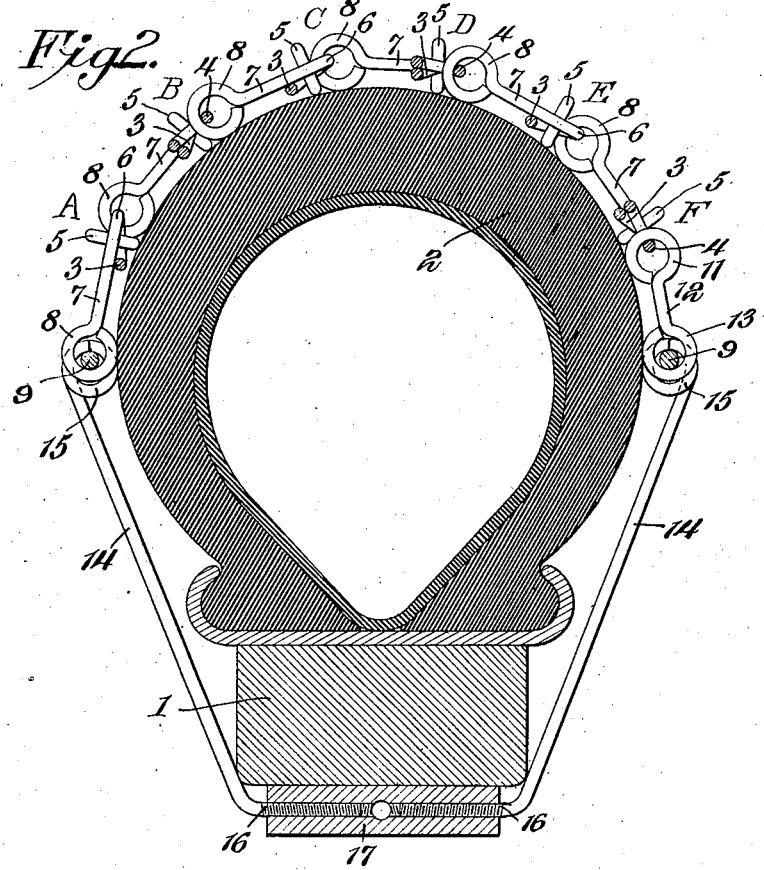
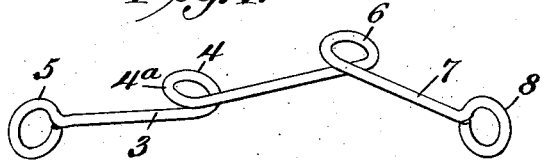
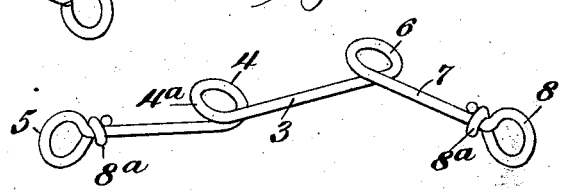

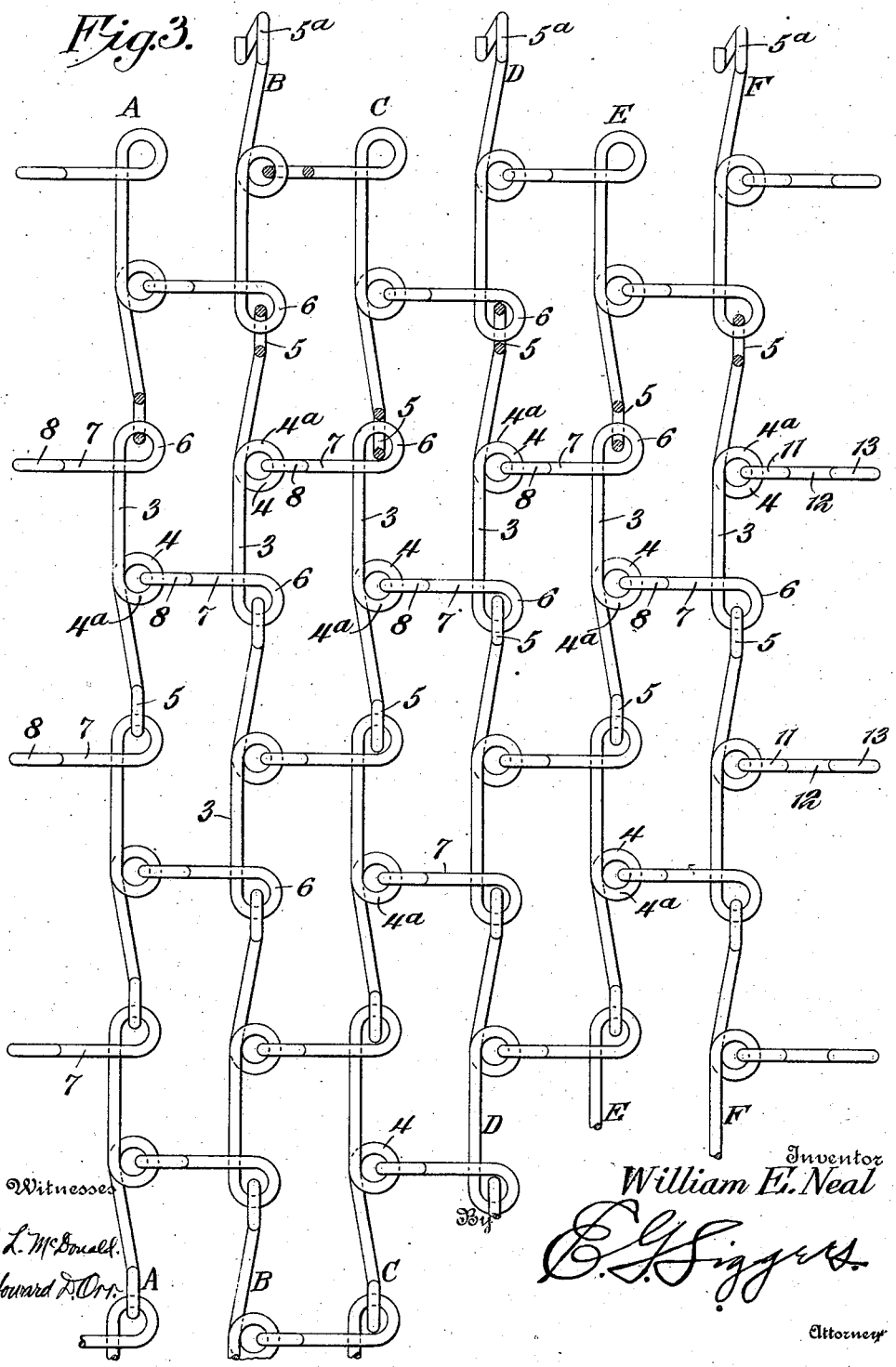

Patented Feb. 15, 1927.

1,618,020

UNITED STATES PATENT OFFICE.

WILLIAM E. NEAL, OF MIDDLETOWN, OHIO.

TIRE CHAIN.

Application filed December 10, 1925. Serial No. 74,504.

This invention relates to tire chains.

The object is to provide a tire chain of strong and durable construction which may be readily applied to the tires of automobiles, trucks, or other vehicles to increase the tractive force thereof, and which, after being properly applied, may be given a tension to stretch the same tautly about the wheel to entirely cover the tread thereof and to come well down over the sides of the tire, all slack or play therein being thus taken out so as to avoid the usual noise incident to the use of ordinary tire chains.

Another object is to provide a chain composed of individual links, similarly formed, except as to rights and lefts, said links being formed of high grade carbon steel or other spring metal capable of withstanding the wear and rough usage to which the same is subjected, the material being in the form of heavy wire which may be readily handled and shaped to produce the links at a low cost.

A further object is to shape the links so that the same may be connected together to form a continuous fabric having longitudinal strands extending around the circumference of the tire in parallel relation to each other, the strands being of different lengths to conform to the cross sectional shape of the tire, and the several strands being connected together by cross arms forming part of the links, with the result that the entire fabric is provided with a plurality of spaced joints, in staggered relation to each other and forming a multiplicity of separate, independent portions, free to move in any direction to accommodate itself to the road and to the surface of the tire.

A final object is to provide a tire having, in addition to the above characteristics, means for directly engaging with the roadway and the tire, the link fabric composing the tire chain being so constructed that the the same may be applied to the tire in a manner to present certain transverse members to the road when travelling in soft, deep mud or other bad conditions, and by reversing the chain, or turning the same inside out on the tire, the said members or elements are placed next to the tire, as when travelling on a hard road surface that is covered with a small amount of snow or ice, or is otherwise slippery, the formation of the links comprising the fabric being such as to cause a springing or flexing of each link when under load and at the point of contact with the road, with the result that the maximum amount of traction is afforded with the invention applied in either manner.

A full and complete understanding of the invention may be obtained from a consideration of the following detailed description, taken in connection with the accompanying drawings forming a part of this specification; it being understood that while the drawings show a practical form of the invention, the latter is not to be confined to strict conformity with the showing thereof, but may be changed or modified, so long as such changes or modifications mark no material departure from the salient features of the invention, as specifically pointed out in the appended claims.

In the drawing, in which similar reference characters designate corresponding parts throughout the several figures:—

Figure 1 is a side elevation of an automobile wheel having the improved tire chain applied thereto, with portions of the chain omitted.

Figure 2 is a cross section of the tire having the chain thereon and drawn on an enlarged scale.

Figure 3 is a diagrammatic plan view of a portion of the tire chain spread out flat and drawn on an enlarged scale.

Figure 4 is a detail perspective view of one of the links comprising the tire chain.

Figure 5 is a similar view of a slightly modified form of link.

Figure 6 is a detail perspective view of a modified form of tensioning device shown in folded position.

Referring more particularly to Figure 1 of the drawings, there is shown an ordinary automobile wheel having the usual felly 1, and mounted thereon an ordinary pneumatic tire 2, and the improved tire chain, which is adapted to be made in different sizes or lengths to extend around the tire with the abutting ends in proper position and with sufficient slack therein to permit of the engagement of the terminal portions of the chain and of sufficient width to extend part way down the sides of the tire and completely cover the tread thereof, there being a special size chain for a particular size of tire.

As shown in the drawings, the chain is composed of multiplicity of links of similar construction, so connected together as to form a flexible fabric having free universal movement on the surface of the tire at any portion thereof, and when applied to the tire in the manner shown and to be described, is held from longitudinal or sidewise movement, or creeping bodily about the tire.

Each link of the fabric, which is adapted to be made from a relatively heavy grade of wire formed of spring steel or spring bronze or other suitable metal, comprises a body portion 3 which extends longitudinally of the circumference of the tire when incorporated in said fabric and applied to the wheel. Referring to Figure 3, each body portion 3 of each link, is provided at a point substantially midway between its ends with an intermediate coil or loop 4 to constitute an eye arranged in a plane to lie flat against the surface of the tire when the links are connected together, and it will be observed, by reference to said figure, that all of the eyes 4 of the connected links extend in the same direction to one side of the body portion, the same being arranged tangentially thereto.

The body portion of each link is provided at one end with an upstanding eye 5 arranged at right angles to the intermediate eye 4 and perpendicular to the surface of the tire, said eye 5 extending equally above and below the contiguous end of the body member. The other end of the body portion of the wire is formed into an outstanding loop or eye 6 formed horizontally and in the same plane as the aforesaid intermediate coil or loop 4 and extending outwardly and in the same direction as the latter, and the terminal portion of the wire constituting the body member is then extended at right angles to the latter to form a laterally-disposed connecting arm 7 tangential with the side of the terminal eye 6 which is adjacent to the intermediate eye 4. The connecting arm 7 is extended a distance substantially equal to one-half the length of the body member, and is formed at its end into a vertically-disposed eye 8 arranged perpendicularly to the eyes 4 and 6 and similarly to the opposite terminal eye 5.

All of the links comprising the fabric of the tire chain are formed in the above manner except that the same are equally divided into right and left hand links and except that, when they are joined together, they form strands composed of links having different lengths, as will now be explained, with reference to Figure 3 of the drawings.

In this figure it will be seen that the several links are joined together to form a fabric of a given width to fit a certain size tire, and that such connection forms a fabric having strands A, B, C, D, E and F, all arranged parallel to each other in spaced relation and adapted to extend longitudinally around the periphery of a tire of said size, and it is, of course, to be understood that such length and breadth of the fabric may be changed, in the process of manufacture, to suit different size tires, that is, of greater or less diameter and greater or less cross-sectional area, by increasing the size of the links or attaching more links at the ends to lengthen the fabric or by inserting or removing one or more strands to increase the width of the fabric.

It will be observed that the links comprising the strands A, C and E are all formed with the connecting arms 7 extending to the left, as viewed in said Figure 3, and all located at the upper ends of the body members 3, while the remaining, alternate strands B, D and E are formed of links having their connecting arms 7 extending from the opposite or lower ends of the links, though in the same direction towards the left, as in the case of the first-named series, and the difference between these two series of links constitutes what has been referred to above as right and left-hand links. As associated in Figure 3, the arms 7 of all of the links of the entire chain have their arms 7 crossing the body members above or on top of the latter, so that with this side of the chain contacting with the road, when applied to the tire, greater tractive force is exerted to the wheel, by reason of these arms projecting to form abutments for engaging in mud, snow or ice, as in the case of very bad roads, and it should here be stated that this side of the chain is adapted for such usage. When, however, merely rainy or slightly slippery roads are to be contended with, the chain may be applied to the tire in the reverse manner, that is to say, with the cross arms 7 next to the tire.

The principal pulling point, however, of the tire chain, no matter in which manner the same is applied to the tire, resides in the transversely-disposed perpendicular eyes 8 at the ends of the cross connecting arms 7, as the same extend equally out from either side of the chain, and act to enter and impinge the road no matter what the condition of the same, and also act to partially enter into the surface of the tire, though without any damage to the latter, to effectually hold the chain in proper non-creeping position on said tire and to provide the maximum traction to the wheel. It will also be seen that with the particular arrangement of the right and the left-hand links, the intermediate eyes or coils 4 are alternately formed in reverse manner, the lowermost half of the body member 3 in the links comprising the strands B, D and F starting on top to form the tangential, flat eyes 4, while in the remaining strands A, C and E, the lowermost half of the body members start to form said eyes from beneath. This arrangement provides additional road engaging projections as defined by the portions 4ª of each of said links, one half of said projections coming into action when the tire chain is applied in one position on the tire, the other half of said projections becoming effective when the chain is reversed on the tire, the said projections, in either event, becoming especially effective when the wheel is revolving in a direction to enter said eye into the snow or mud with the portion 4ª in advance.

The terminal eye 5 of one link of each series or strand is adapted to be engaged at right angles in the other terminal eye 6 of the next adjacent link of the same strand, and the terminal eye 6 of the same first-mentioned eye is likewise engaged, and since the eyes are considerably larger than the diameter of the wire comprising said links, a loose, flexible connection is provided, affording free and universal movement of one link relative to another, but securely holding the two together.

The length of each link is such that when the tire bears directly upon one of the perpendicularly-disposed eyes, say the eye 5 of one link, assuming that the wheel is revolving in the proper direction, the eye 6 of the following link is forced, by the rubber tire, to the bottom of said eye 5, and the first half or portion of said following link is bent or flexed until the intermediate eye 4 and its connected eye 8 engage the ground, when the first half of the body portion springs back to normal position and the second half of the link is flexed, between the coil or eye 4 and the other terminal eye 5 of said following link, until the latter two eyes engage the road, when said second half again springs back into normal position, thus providing a multiplicity of constantly flexing, springing and returning arms or portions throughout the entire fabric, which greatly assists in the tractive force of the wheel and which serves to provide a clinging or gripping surface to the tire, noiseless and self-adjusting in its action and permitting of considerable lateral or radial movement of any portion of the tire chain when under the load, by reason of the springing action of the two halves of the body member of the links and the lateral arms thereof, assisted by the spring action of the several coils or eyes.

It will be observed that the portion of the body member of each link between the eyes 4 and 6 thereof, is exactly longitudinal of the circumference of the tire, the centers of the tangential eyes 4 and 6 being in longitudinal alinement and arranged to one side of said portion, while the remaining portion of the body member 3 is bent at a slight angle thereto in order to extend directly to the center of the eye 6 of the next succeeding link, as is clearly shown in Figure 3 of the drawing, and this formation allows of all of the connecting eyes 4, 5 and 6 to be located in exact longitudinal alinement, so that the strain of the pull of the tire, while in motion, is always along straight lines.

In order to adapt the tire chain to the tire and to provide for the difference in the distance around the center portions of the tread of the tire where traversed by the center strands C and D and the distance to be covered by the other strands, more or less at the sides of the tire, the body portions in the center strands C and D are of the same length in each strand, as they cover the same distance, being at equal distances at each side of the center of the tire periphery, and the links of the strands B and D are slightly shorter each, as said strands occupy a position substantially at forty-five degrees to the vertical center of the tire, as clearly shown in Figure 2 of the drawings. The links of the outermost or marginal strands A and F are correspondingly shorter than those of the strands B and E, as the same occupy a position nearly at the sides of the tire, and as there must be exactly the same number of links in each of the strands, in order to connect the same to form a complete fabric, as hereinbefore described, it will be seen that the successive shortening of the links of the several strands provides a fabric that may be snugly fitted around the tire, the ends of said fabric being easily connected together by means of the open eyes or loops 5ª formed on one end series of links detachably engaging the terminal eyes 6 of the other end series and caused, when placed under tension in a manner to be described, to hug the tire at all times.

The series of transversely-disposed connecting arms 7 that extend outwardly from the fabric from the marginal strand at one side of the same, since they have no co-acting eyes 4 of an adjacent strand to connect with, are utilized for placing tension on the fabric when placed about the tire 2 and to this end a continuous hoop or band 9 is threaded through the several terminal eyes 8 of said arms, and the band is drawn tightly in circular form by a turnbuckle 10 to cause a uniform radial pull on all of said arms at that side of the tire. At the other side of the fabric, the intermediate eyes 4 of each link are adapted to be loosely engaged by terminal eyes 11 of short links 12 arranged at right angles to the marginal strand of the fabric and adapted to be drawn down into radial position on the tire, similar to the other side thereof, by means of a similar tensioning hoop or band 9 passing through terminal eyes 13 formed on the free ends of said links 12, and tightened by a similar turnbuckle (not shown).

When the fabric is placed under tension on the tire, as shown in Figure 2 of the drawings, the contact of the eyes 8 with the tire, by reason of the transverse curvature of the face thereof, causes the arms 7 to rock the links and the perpendicular, longitudinally-disposed eyes 5 to assume a position slightly tangential to the center of the tire thus forcing said links at an angle into the mud or snow, etc., and securing a better hold therein to increase the tractive force of the wheel.

When the tire chain is thus applied and held in position, a further safeguard against dislodgment is employed in the form of rods 14 arranged radially at either side on the wheel and having open eyes 15 at their outer terminals for detachably engaging the tensioning hoops 9 at various points around the same. The opposite or inner ends 16 of the rods are bent at an angle to extend inwardly towards each other and transversely of the felly 1, the said transverse portions being oppositely threaded for the reception of a tubular turnbuckle 17 which bears against the inner face of the said felly and effectually prevents any outward movement or shifting of the chain.

A modification of the links is shown in Figure 5 of the drawings wherein the terminals of the wire, where forming the eyes 5 and 8 respectively, are slightly longer and are wrapped about the adjacent portions of the body member 3 and the lateral arm 7, as indicated at 8ª.

The tensioning hoops or bands may also be modified, as shown in Figure 6, the same being formed of arcuate sections 9ª having terminal eyes 9ᵇ for flexibly connecting the same together and of a length to form a complete circular hoop when unfolded of similar proportions to the hoops 9. The terminals of the end arcuate sections are oppositely threaded for the reception of a turnbuckle 10ª which draws the sectional and collapsible tensioning hoop together when properly threaded through the several eyes 8 as aforesaid, the eyes 9ᵇ being formed small enough to be thus passed through.

From the foregoing it will be seen that a strong and durable tire chain has been provided which, when applied, fits the tire snugly around the entire active surface thereof and may be easily tightened to take up slack therein, the particular form of the links having the several spring coils or loops providing for the resilient leverage action of the body members of all the links independently of each other and ample ground-engaging projections are provided for causing the maximum amount of tractive force to the drive wheels of automobiles, etc.

What is claimed is:—

1. A tire chain comprising a plurality of longitudinally disposed strands adapted to extend circumferentially around a tire, each strand being alternately composed of right and left hand links.

2. A tire chain comprising a series of longitudinal strands formed of spring links loosely connected together at their terminals, the links of every alternate strand having a transversely disposed arm extending from the upper end thereof and loosely connected to an adjacent strand on one side to constitute right hand links, while the arms from the other alternate strands extend in the same direction from the lower ends of the links thereof to constitute left hand links.

3. A tire chain comprising a series of spaced, longitudinal strands connected together and adapted to be secured around a tire, each strand comprising a series of spring metal links of elongated form bent to form terminal eyes for flexible connection with similar eyes of adjacent links in the same strand, each link having a laterally disposed connecting arm terminating in an eye and having an intermediate eye for flexible connection with the terminal eye on a lateral arm of a link in the adjacent strand.

4. A tire chain composed of spring wire links formed and connected together to provide a mesh or fabric having substantially rectangular openings therethrough, each link having an elongated body member adapted to extend longitudinally around the circumference of the tire and provided with terminal eyes for connecting a series of links together to form a strand and having a spring coil to constitute an eye intermediate between the terminal eyes, and each link also having one terminal of the wire, where forming the eye, extended at right angles thereto and terminating in an eye for connection to an intermediate eye of a link in the next adjacent strand to joint the several strands together.

5. A tire chain composed of spring metal links connected together to form longitudinal, parallel strands, the joints between the links of the several strands being staggered and each link having a terminal eye at each end for connection to each other in the same strand, and an intermediate eye formed thereon and extending to one side, each link also having one terminal extended at right angles thereto to form an arm parallel to the surface of the tire to impinge the road transversely of the direction of travel and having a terminal eye at its free end to connect with the intermediate eye on a link in the adjacent strand.

6. A tire chain composed of spring metal links of elongated form, each having its intermediate portion formed into a coil or eye adapted to lie flat against the surface of the tire, one end of the metal being extended tangentially therefrom and terminating in an eye at right angles to the intermediate eye and perpendicular to the tire to impinge the latter and the road, said metal being also tangential and extended from the other end of the intermediate coil or eye and at a slight angle to the other terminal extension and having a terminal coil or eye formed therein lying flat or parallel to the intermediate eye to enable the several links to be connected into strands, the last-named eye having its terminal extended at right angles to the adjacent portion of the link to form a connecting arm, said arm terminating in an eye perpendicular to the tire to impinge the tire and the road and to engage in the intermediate eye of another link of an adjacent strand to connect all the links in a fabric having spaced, parallel strands to extend around the tire.

7. A tire chain composed of links of spring metal wire bent into substantial L-shape, each link having a longitudinally disposed body portion and a right angularly disposed connecting arm joined thereto by a spring coil or eye adapted to lie flat against the tire, said body portion also having an intermediate spring coil or eye adapted to lie flat against the tire, the opposite end of the body portion and the free end of the connecting arm each terminating in an eye arranged perpendicularly to the other eyes and adapted, when the tire chain is applied and under tension, to engage the road or ground at an angle.

8. A tire chain composed of links of spring metal wire bent into substantial L-shape, each link having a longitudinally disposed body portion and a right angularly disposed, connecting arm joined thereto by a spring coil or eye adapted to lie flat against the tire, said body portion also having an intermediate spring coil or eye adapted to lie flat against the tire, the opposite end of the body portion and the free end of the connecting arm each terminating in an eye arranged perpendicularly to the other eyes, said flat eye at the angle of each L-shaped link being adapted to engage with the terminal, perpendicular eye of another link, and the perpendicular eye at the end of the connecting arm being adapted to engage with the flat, intermediate eye of still another link, to provide a mesh or fabric having flexible joints in staggered relation to each other.

9. A tire chain composed of links of spring metal wire bent into substantial L-shape, each link having a longitudinally disposed body portion and a right angularly disposed connecting arm joined thereto by a spring coil or eye adapted to lie flat against the tire, said body portion also having an intermediate spring coil or eye adapted to lie flat against the tire, the opposite end of the body portion and the free end of the connecting arm each terminating in an eye arranged perpendicularly to the other eyes, the said connecting arms of all the links extending in the same transverse direction, when they are engaged with the intermediate eyes and the body terminal eyes are connected, that series of unconnected projecting arms at one margin of the tire chain fabric extending laterally on the tire when applied, a flexible, circular, tensioning hoop having a turn-buckle and adapted to be threaded through the terminal eyes of said laterally disposed arms to tighten the tire chain on that side, a series of independent, laterally disposed links connected to the intermediate eyes at the other margin of said fabric, said independent links terminating in eyes at their free ends, and another, similar tensioning hoop provided with a turn-buckle and adapted to engage said terminal eyes to exert tension on that side of the tire chain and hold the same in position on the tire.

10. A tire chain composed of spring metal wire links each bent to form a longitudinal body portion having spring coils or eyes and a transverse connecting arm having a terminal eye for connecting the links together to form a fabric, certain of said eyes being flat and the others perpendicular thereto to engage the ground or road, the connecting arms all extending in one direction and all passing across on top of the body portions when the tire chain is applied in one position to enhance the traction in bad roads, and being arranged under the body portions and adjacent to the tire when the chain is applied in the reverse position for good roads, said transverse connecting arms extending from the same ends of every alternate, longitudinal series of links and from the opposite ends of those links of the other longitudinal series, to form a uniformly flexible fabric having staggered joints and resilient in all directions under load.

In testimony, that I claim the foregoing as my own, I have hereto affixed my signature.

WILLIAM E. NEAL.